(12) United States Patent
Aoki et al.

(10) Patent No.: US 10,788,943 B2
(45) Date of Patent: Sep. 29, 2020

(54) TOUCH PANEL-EQUIPPED DISPLAY DEVICE

(71) Applicant: Sharp Kabushiki Kaisha, Sakai, Osaka (JP)

(72) Inventors: Atsushi Aoki, Sakai (JP); Shinichi Miyazaki, Sakai (JP); Takatoshi Kira, Sakai (JP); Mikihiro Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/467,060

(22) PCT Filed: Dec. 12, 2017

(86) PCT No.: PCT/JP2017/044517
§ 371 (c)(1),
(2) Date: Jun. 6, 2019

(87) PCT Pub. No.: WO2018/110533
PCT Pub. Date: Jun. 21, 2018

(65) Prior Publication Data
US 2019/0286281 A1    Sep. 19, 2019

(30) Foreign Application Priority Data

Dec. 15, 2016    (JP) .................................. 2016-243513

(51) Int. Cl.
*G06F 3/044*    (2006.01)
*G06F 3/041*    (2006.01)
(Continued)

(52) U.S. Cl.
CPC ........... *G06F 3/0443* (2019.05); *G04G 21/00* (2013.01); *G06F 3/041* (2013.01); *G06F 3/047* (2013.01); *G06F 3/0412* (2013.01)

(58) Field of Classification Search
None
See application file for complete search history.

(56) References Cited

U.S. PATENT DOCUMENTS

2018/0348943 A1* 12/2018 Yoon ..................... G06F 3/0443
2019/0384441 A1* 12/2019 Seo ........................ G06F 3/0412

FOREIGN PATENT DOCUMENTS

| JP | 2013-65429 A | 4/2013 |
| JP | 2014-67103 A | 4/2014 |

(Continued)

*Primary Examiner* — Ifedayo B Iluyomade
(74) *Attorney, Agent, or Firm* — Keating & Bennett, LLP (57) ABSTRACT

Provided is a technique of preventing a decrease in touch detection sensitivity even in the case where an air layer is present between electrodes for touch detection in a mutual capacitance touch panel-equipped display device. A touch panel-equipped display device 1 includes: a substrate 11; a plurality of first electrodes Rx spaced from each other on the substrate 11; a second electrode Tx located around or inside the plurality of first electrodes Rx on the substrate 11, to form a capacitance with each of the first electrodes; and a translucent cover portion C facing the substrate 11. Each of the first electrodes Tx or the second electrode Rx is in contact with the cover portion C, and an air layer AG is interposed between the substrate 11 and the cover portion C in a region in which an electrode not in contact with the cover portion C is located.

4 Claims, 5 Drawing Sheets

(51) Int. Cl.
　　　*G06F 3/047*　　　(2006.01)
　　　*G04G 21/00*　　　(2010.01)

(56) References Cited

FOREIGN PATENT DOCUMENTS

| | | |
|---|---|---|
| JP | 2014-71863 A | 4/2014 |
| JP | 2016-100092 A | 5/2016 |
| WO | PCT/IB2016057087 | * 11/2016 |
| WO | PCT/KR2016013772 | * 11/2016 |

* cited by examiner

F I G. 1

F I G. 2

F I G. 3A

F I G. 3B

F I G. 4

F I G. 5 A

F I G. 5 B

F I G. 6

F I G. 7

TOUCH PANEL-EQUIPPED DISPLAY DEVICE

TECHNICAL FIELD

The present invention relates to a touch panel-equipped display device.

BACKGROUND ART

Various techniques for improving the accuracy of touch panel-equipped display devices have been proposed in recent years. JP 2014-71863 A discloses a self-capacitance touch panel. This touch panel includes a detection electrode pattern provided on a transparent substrate, a wiring pattern connected to the detection electrode pattern, and a cover panel facing the transparent substrate. An air layer is interposed between the cover panel and the detection electrode pattern. According to JP 2014-71863 A, the air layer is provided to suppress a change of the capacitance in the case where a finger approaches the wiring pattern, thus preventing touch detection errors.

DISCLOSURE OF THE INVENTION

Figure 7:
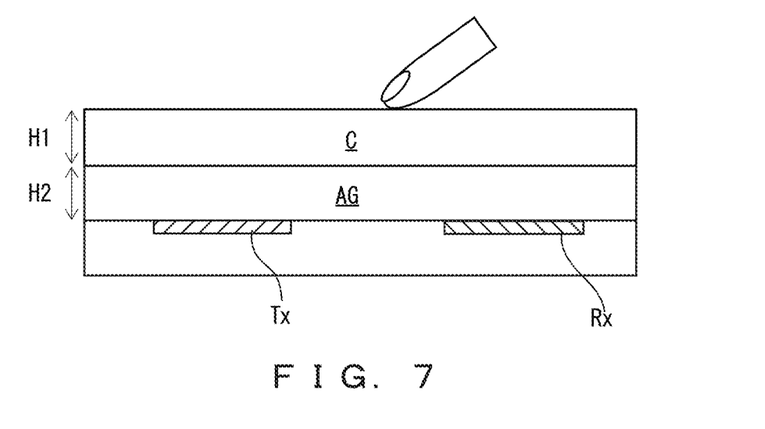
FIG. 7 is a sectional view illustrating the schematic structure of a conventional touch panel-equipped display device.

However, if an air layer is interposed between a touch surface and electrodes for touch detection in a mutual capacitance touch panel, touch detection sensitivity decreases. For example, in the case where an air layer AG is interposed between a cover panel C and both a transmission electrode Tx and a reception electrode Rx as illustrated in FIG. 7, the electric field intensity between the transmission electrode Tx and the reception electrode Rx decreases as compared with the case where the air layer AG is not interposed, due to the difference in relative permittivity between the cover panel C and the air layer AG. Consequently, the change of capacitance upon touch decreases, and touch detection sensitivity decreases.

An object of the present invention is to provide a technique of preventing a decrease in touch detection sensitivity even in the case where an air layer is present between electrodes for touch detection in a mutual capacitance touch panel-equipped display device.

A touch panel-equipped display device according to an aspect of the present invention is a touch panel-equipped display device equipped with a mutual capacitance touch panel, including: a substrate; a plurality of first electrodes spaced from each other on the substrate; a second electrode located around or inside the plurality of first electrodes on the substrate, to form a capacitance with each of the plurality of first electrodes; and a translucent cover portion facing the substrate, wherein each of the plurality of first electrodes or the second electrode is in contact with the cover portion, and an air layer is interposed between the substrate and the cover portion in a region in which an electrode not in contact with the cover portion from among each of the plurality of first electrodes and the second electrode is located.

According to the present invention, a decrease in touch detection sensitivity can be prevented even in the case where an air layer is present between electrodes for touch detection.

EMBODIMENTS FOR CARRYING OUT THE INVENTION

A touch panel-equipped display device according to an aspect of the present invention is a touch panel-equipped display device equipped with a mutual capacitance touch panel, including: a substrate; a plurality of first electrodes spaced from each other on the substrate; a second electrode located around or inside the plurality of first electrodes on the substrate, to form a capacitance with each of the plurality of first electrodes; and a translucent cover portion facing the substrate, wherein each of the plurality of first electrodes or the second electrode is in contact with the cover portion, and an air layer is interposed between the substrate and the cover portion in a region in which an electrode not in contact with the cover portion from among each of the plurality of first electrodes and the second electrode is located (first structure).

With the first structure, each of the plurality of first electrodes or the second electrode is in contact with the cover portion, and the air layer is interposed between the substrate and the cover portion in the region in which the electrode not in contact with the cover portion is located. The air layer typically has a low relative permittivity of 1.0. With this structure, the region in which the air layer is provided is smaller than in the case where the air layer is interposed between the cover portion and both the first electrode and the second electrode, so that a decrease in the electric field intensity between the first electrode and the second electrode is suppressed. A decrease in sensitivity upon detecting touch can thus be prevented.

In the first structure, the touch panel-equipped display device may further include: a plurality of first wires connected respectively to the plurality of first electrodes; a second wire adjacent to at least part of the plurality of first wires, and connected to the second electrode; and a grounded shield wire located between the second wire and a first wire adjacent to the second wire (second structure).

With the second structure, the grounded shield wire is located between the first wire connected to the first electrode and the adjacent second wire. Hence, parasitic capacitance between the first wire and the second wire can be reduced to improve touch detection accuracy.

In the first or second structure, the substrate may have an opening through the substrate, the air layer may be formed in the opening and between the cover portion and a region in which an electrode closer in distance to the opening from among each of the plurality of first electrodes and the second electrode is located, and the touch panel-equipped display device may further include: a display panel located on an opposite side of the substrate from the cover portion, and having an opening at a position facing the opening of the substrate; an hour hand and a minute hand pivotally supported in the opening of the substrate and the opening of the display panel; and a movement pivotally supporting the hour hand and the minute hand (third structure).

With the third structure, in the openings formed in the substrate and the display panel located on the opposite side from the cover portion, the hour hand and the minute hand are pivotally supported by the movement. The air layer is interposed between the substrate and the cover portion in the region including the opening of the substrate and the first electrode or the second electrode closer in distance to the opening. This allows the hour hand and the minute hand to be provided in the air layer part. A touch panel-equipped display device having a watch function can thus be provided.

In any of the first to third structures, the substrate may have a circular shape, the plurality of first electrodes may be arranged in a circular shape, the second electrode may be located outside or inside the plurality of first electrodes on the substrate, and an electrode closer in distance to a periphery of the substrate from among each of the plurality of first electrodes and the second electrode may be in contact with the cover portion (fourth structure).

With the fourth structure, the plurality of first electrodes are arranged in a circular shape, and the second electrode is located outside or inside the plurality of first electrodes. The electrode closer to the periphery of the substrate from among each of the first electrodes and the second electrode is in contact with the cover portion, and the air layer is interposed between the first electrode and the cover portion. A touch panel-equipped display device of a circular shape without a decrease in touch detection sensitivity can thus be provided.

In any of the first to fourth structures, the cover portion may have a relative permittivity of 6.0 or more and 8.0 or less (fifth structure).

Embodiments of the present invention are described in detail below with reference to the drawings. The same or corresponding components in the drawings are given the same reference signs, and their description is not repeated. In the drawings referenced below, structures are simplified or schematically illustrated and some structural members are omitted for ease of explanation. The dimensional ratios between the structural members in each drawing do not necessarily represent the actual dimensional ratios.

Figure 1:
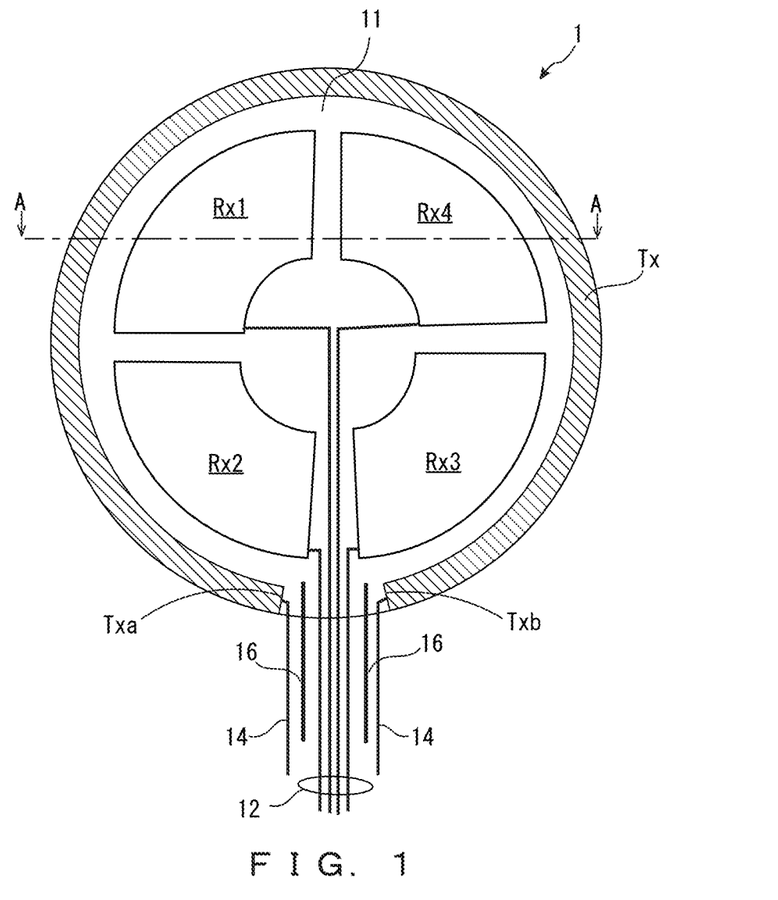
FIG. 1 is a top view illustrating the schematic structure of a touch panel-equipped display device according to an embodiment.
Figure 2:
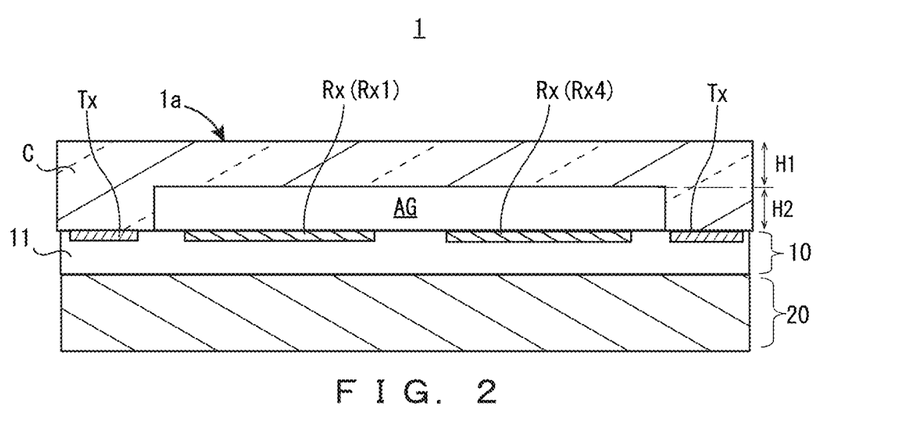
FIG. 2 is an A-A sectional view of the touch panel-equipped display device illustrated in FIG. 1.

FIG. 1 is a top view illustrating the schematic structure of a touch panel-equipped display device according to this embodiment. FIG. 2 is an A-A sectional view of the touch panel-equipped display device illustrated in FIG. 1.

A touch panel-equipped display device 1 according to this embodiment has a circular shape, as illustrated in FIG. 1. The touch panel-equipped display device 1 includes a touch panel portion 10, a display panel 20, and a cover panel C covering the touch panel portion 10 and the display panel 20, as illustrated in FIG. 2. The cover panel C is omitted in FIG. 1.

The touch panel-equipped display device 1 is used, for example, in a terminal such as a smartwatch smaller in size than a smartphone.

The cover panel C is translucent, and is made of a material with a relative permittivity of 6.0 or more and 8.0 or less. For example, the cover panel C is made of soda-lime glass or the like.

The touch panel portion 10 includes a substrate 11, four reception electrodes Rx (Rx1 to Rx4), a transmission electrode Tx, reception electrode wires 12, transmission electrode wires 14, and shield wires 16.

The substrate 11 has a circular shape as illustrated in FIG. 1, and is formed using a translucent glass or resin material.

The reception electrodes Rx1 to Rx4 are spaced from each other on the substrate 11. The reception electrodes Rx1 to Rx4 each have a fan shape obtained by dividing a circle having a hollow center into quarters. More specifically, the reception electrodes Rx1 to Rx4 have approximately the same length of circular arc on the central side of the substrate 11, and approximately the same length of circular arc on the peripheral side of the substrate 11.

The transmission electrode Tx is located along the periphery of the substrate 11 so as to surround the reception electrodes Rx1 to Rx4 on the substrate 11, as illustrated in FIG. 1. The transmission electrode Tx has a circular shape with a break in one part, and has two separate ends Txa and Txb.

The reception electrodes Rx1 to Rx4 and the transmission electrode Tx are composed of, for example, transparent electrodes using indium tin oxide (ITO) or the like, or metal meshes using copper (Cu) or the like.

The touch panel portion 10 includes a touch drive circuit (not illustrated). The reception electrodes Rx1 to Rx4 are each connected to a reception electrode wire 12, and connected to the touch drive circuit via the reception electrode wire 12. The ends Txa and Txb of the transmission electrode Tx are each connected to a transmission electrode wire 14, and connected to the touch drive circuit via the transmission electrode wire 14.

A pulse voltage is applied to the transmission electrode Tx from the touch drive circuit (not illustrated) via the transmission electrode wires 14. Each of the reception electrodes Rx1 to Rx4 detects the capacitance with the transmission electrode Tx, and outputs the detection result to the touch drive circuit (not illustrated) via the reception electrode wire 12. For example, the reception electrodes Rx1 to Rx4 sequentially output detected capacitances in this order to the touch drive circuit (not illustrated) at fixed intervals.

Two shield wires 16 are arranged between the transmission electrode wires 14 and the reception electrode wires 12, as illustrated in FIG. 1. The shield wires 16 are grounded, and decrease parasitic capacitance between the transmission electrode wires 14 and the reception electrode wires 12.

Although the reception electrodes Rx (Rx1 to Rx4), the transmission electrode Tx, the reception electrode wires 12, the transmission electrode wires 14, and the shield wires 16 are provided on the substrate 11 in this example, they may be provided directly on the surface of the display panel 20.

The transmission electrode Tx is in contact with the cover panel C, whereas each reception electrode Rx is not in contact with the cover panel C and an air layer AG is interposed between the reception electrode Rx and the cover panel C, as illustrated in FIG. 2.

In the case where the air layer AG is also interposed between the transmission electrode Tx and the cover panel C as illustrated in FIG. 7, the intensity of the electric field formed between the transmission electrode Tx and the reception electrode Rx decreases due to the difference in permittivity between the cover panel C and the air layer AG, as a result of which the detection sensitivity when the touch surface 1a is touched decreases.

Figure 3A:
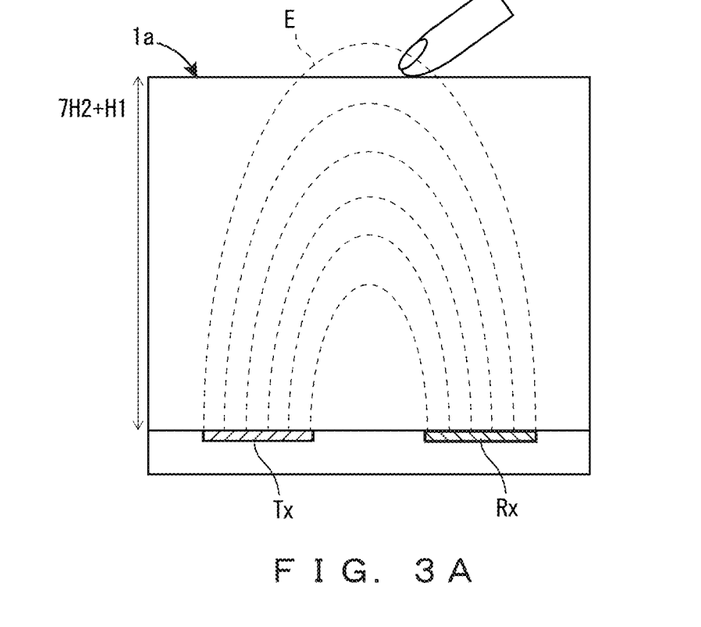
FIG. 3A is a conceptual diagram illustrating the substantial distance between a transmission electrode and a reception electrode in the case where an air layer is interposed between a cover panel and both the transmission electrode and the reception electrode.

For example, when the relative permittivity ε1 of the cover panel C is 7.0, the relative permittivity ε2 of the air layer AG is about 1.0. In this case, 1 mm of the air layer AG corresponds to about 7 mm of the cover panel C. In other words, the part of the air layer AG is equivalent to a state in which a cover panel C with a thickness of 7H2 is present. That is, the distance from the touch surface 1a to the transmission electrode Tx and the reception electrode Rx is substantially 7H2+H1, as illustrated in FIG. 3A. Thus, when the air layer AG lower in permittivity than the cover panel C is present between the cover panel C and both the transmission electrode Tx and the reception electrode Rx, the substantial distance between the transmission electrode Tx and the reception electrode Rx increases. This causes a decrease in the intensity of the electric field E between the transmission electrode Tx and the reception electrode Rx, and makes it difficult to detect a capacitance change by touch on the touch surface 1a.

Figure 3B:
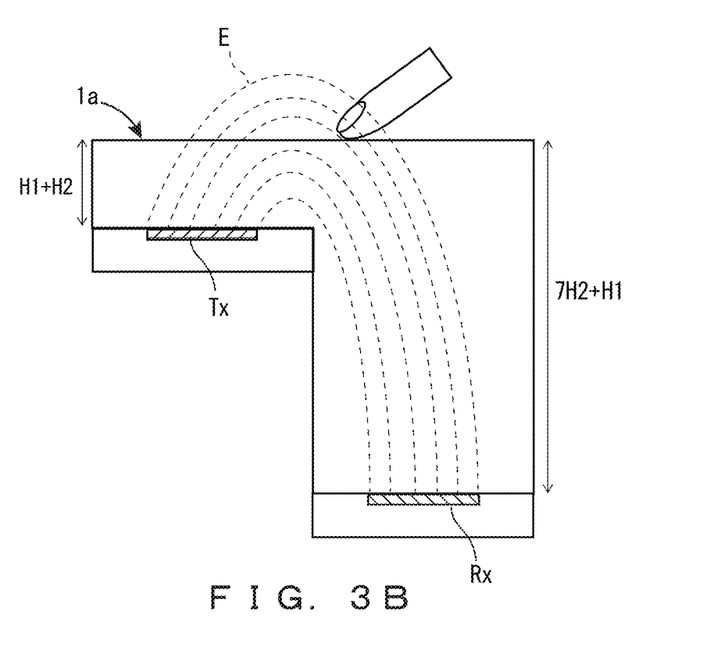
FIG. 3B is a conceptual diagram illustrating the substantial distance between a transmission electrode and a reception electrode in the touch panel-equipped display device according to the embodiment.

In this embodiment, the transmission electrode Tx and the cover panel C are in contact with each other, and the air layer AG is not present between the transmission electrode Tx and the cover panel C, as illustrated in FIG. 2. Accordingly, the distance between the transmission electrode Tx and the touch surface 1a corresponds to the thickness of the cover panel C (H1+H2). Meanwhile, the air layer AG with the thickness H2 is present between the reception electrode Rx and the cover panel C. Since the part of the air layer AG is equivalent to a state in which a cover panel C with a thickness of 7H2 is present as mentioned above, the distance between the reception electrode Rx and the touch surface 1a is substantially 7H2+H1. Thus, the distance between the touch surface 1a and the transmission electrode Tx is H1+H2, and the distance between the touch surface 1a and the reception electrode Rx is substantially 7H2+H1, as illustrated in FIG. 3B.

Since the region in which the air layer AG lower in permittivity than the cover panel C is present between the transmission electrode Tx and the reception electrode Rx is smaller than in the case of FIG. 3A, the substantial distance between the transmission electrode Tx and the reception electrode Rx is shorter than in the case of FIG. 3A. Hence, the intensity of the electric field E between the transmission electrode Tx and the reception electrode Rx is higher. This eases detection of a capacitance change upon touch.

Referring back to FIG. 2, the display panel 20 is located on the opposite side of the touch panel portion 10 from the touch surface 1a. The display panel 20 is, for example, a liquid crystal panel, and has a circular shape as with the substrate 11 of the touch panel portion 10. The touch panel-equipped display device 1 includes a display control circuit (not illustrated). The display panel 20 displays an image based on a control signal from the display control circuit.

Thus, as a result of the transmission electrode Tx being in contact with the cover panel C, the electric field intensity between the transmission electrode Tx and the reception electrode Rx increases as compared with the case where the air layer AG is interposed between the cover panel C and both the transmission electrode Tx and the reception electrode Rx, so that a decrease in touch detection sensitivity can be prevented. Moreover, as a result of the grounded shield wire 16 being provided between the adjacent transmission electrode wire 14 and reception electrode wire 12, parasitic capacitance between the transmission electrode wire 14 and the reception electrode wire 12 can be reduced to improve touch detection sensitivity.

(Example Application)

The touch panel-equipped display device in the foregoing embodiment may be provided with hands of a watch to add a watch function to the touch panel-equipped display device.

Figure 4:
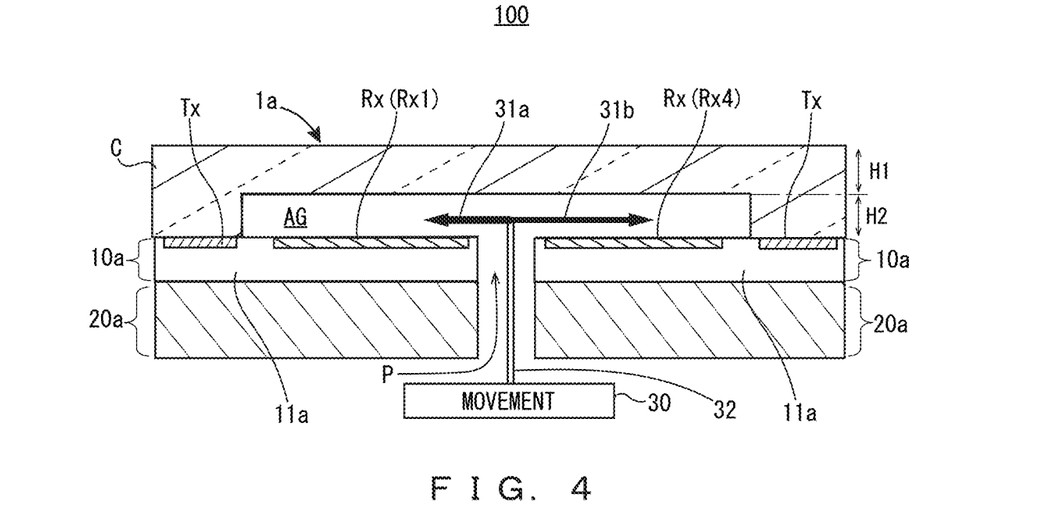
FIG. 4 is a sectional view illustrating the schematic structure of a touch panel-equipped display device according to an example application of the embodiment.

FIG. 4 is a schematic sectional view of a touch panel-equipped display device having a watch function. In FIG. 4, the same components as those in the foregoing embodiment are given the same reference signs. Differences from the foregoing embodiment are mainly described below.

A touch panel-equipped display device 100 includes a touch panel portion 10a, a display panel 20a, a movement 30, an hour hand 31a, and a minute hand 31b, as illustrated in FIG. 4.

The touch panel portion 10a and the display panel 20a respectively have the same structures as the touch panel portion 10 and the display panel 20 described above, except that an opening P is provided in a center.

The hour hand 31a and the minute hand 31b are pivotally supported in the opening P of the touch panel portion 10a and the display panel 20a, and located in the space of the air layer AG. The hour hand 31a and the minute hand 31b are connected to a movement 30 via a shaft 32. The hour hand 31a and the minute hand 31b are preferably an insulator. In the case of using a conductor as the hour hand 31a and the minute hand 31b, the hour hand 31a and the minute hand 31b are provided in a floating state.

The movement 30 includes a quartz crystal, an electronic circuit, a battery, a motor, a gear, and the like (not illustrated). In the movement 30, the electronic circuit oscillates the quartz crystal using power of the battery, converts the oscillation into an electrical signal, and drives the motor, thereby rotating the gear. This rotation of the gear moves the hour hand 31a and the minute hand 31b.

Thus, in the case where the air layer AG is interposed between the cover panel C and the touch panel portion 10a, the hands of a watch can be provided in the space of the air layer AG. This enables the touch panel-equipped display device 100 to function as a watch. Moreover, since the transmission electrode Tx and the cover panel C are in contact with each other in the touch panel-equipped display device 100 as in the foregoing embodiment, a decrease in the electric field intensity between the transmission electrode Tx and the reception electrode Rx is suppressed to prevent a decrease in touch detection sensitivity. Although a second hand is not provided in this example, a second hand may be provided.

While a touch panel-equipped display device according to an embodiment of the present invention has been described above, the touch panel-equipped display device according to the present invention is not limited to the structure in the foregoing embodiment, and various modifications are possible. Examples of such modifications are described below.

[Modification 1]

Figure 5A:
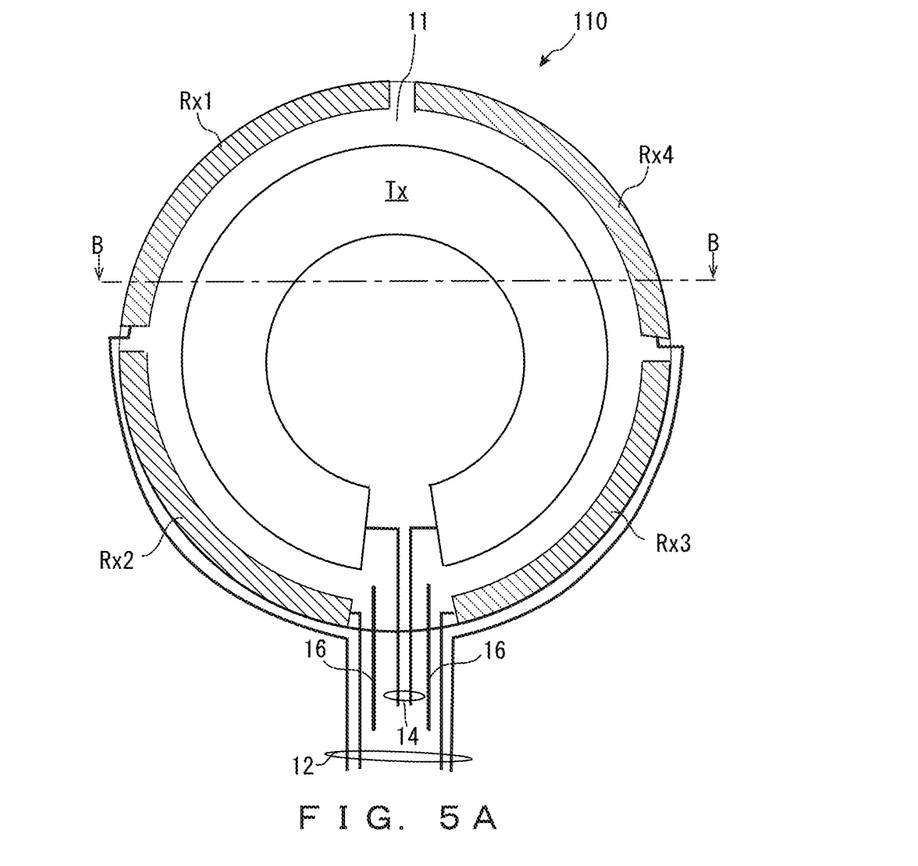
FIG. 5A is a top view illustrating the schematic structure of a touch panel-equipped display device according to modification 1.
Figure 5B:
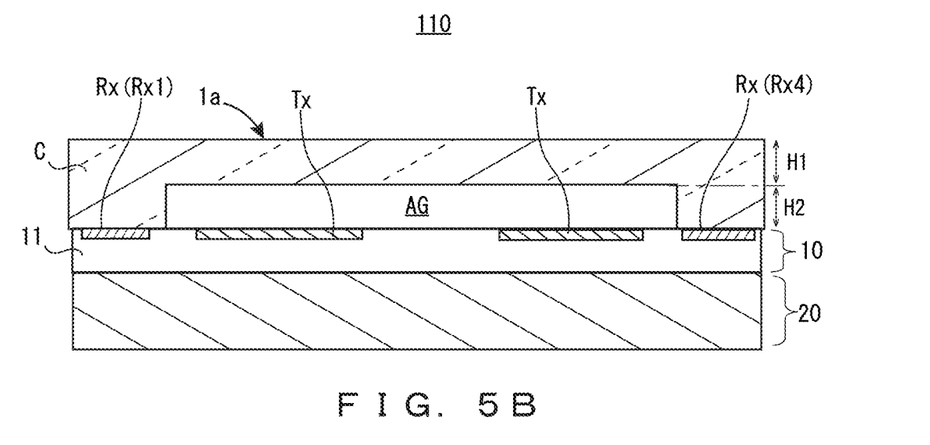
FIG. 5B is a B-B sectional view of the touch panel-equipped display device illustrated in FIG. 5A.

The transmission electrode Tx and the reception electrodes Rx in the foregoing embodiment may be interchanged. FIG. 5A is a top view of a touch panel-equipped display device according to this modification 1. FIG. 5B is a B-B sectional view of the touch panel-equipped display device illustrated in FIG. 5A. A touch panel-equipped display device 110 may include, on a substrate 11, four reception electrodes Rx arranged along the periphery of the substrate 11 and in contact with the cover panel C and a transmission electrode Tx located inside the reception electrodes Rx and having a circular shape with a break in one part, as illustrated in FIGS. 5A and 5B.

In this case, the air layer AG is interposed between the transmission electrode Tx and the cover panel C, but not interposed between each reception electrode Rx and the cover panel C. Therefore, as in the foregoing embodiment, a decrease in the electric field intensity between the transmission electrode Tx and the reception electrode Rx is suppressed to prevent a decrease in touch detection sensitivity, as compared with the case where the air layer AG is interposed between the cover panel C and both the transmission electrode Tx and the reception electrode Rx.

Although the four reception electrodes Rx1 to Rx4 are provided at the position of the transmission electrode Tx in FIG. 1 in this example, one reception electrode Rx having a circular shape with a break in one part may be provided at the position of the transmission electrode Tx in FIG. 1. Although one transmission electrode Tx is provided at the positions of the reception electrodes Rx1 to Rx4 in FIG. 1 in this example, four transmission electrodes Tx may be provided at the positions of the reception electrodes Rx1 to Rx4 in FIG. 1. In this case, a pulse voltage is applied sequentially to the four transmission electrodes Tx from the touch drive circuit (not illustrated) via transmission electrode wires 14 at fixed intervals. The reception electrode Rx detects the capacitance with each transmission electrode Tx, and outputs the detection result to the touch drive circuit (not illustrated) via a reception electrode wire 12.

[Modification 2]

Although the foregoing embodiment describes an example in which the number of reception electrodes Rx is four, the number of reception electrodes Rx may be two or more. In this case, it is preferable that the reception electrodes Rx have approximately the same length of circular arc, that is, the reception electrodes Rx have approximately the same shape and size. The transmission electrode Tx may have a circular shape, or a circular shape having a hollow center. In addition to such reception electrodes Rx and transmission electrode Tx, the touch panel-equipped display device according to this modification may include the same opening, movement, hour hand, and minute hand as in the foregoing example application.

[Modification 3]

Figure 6:
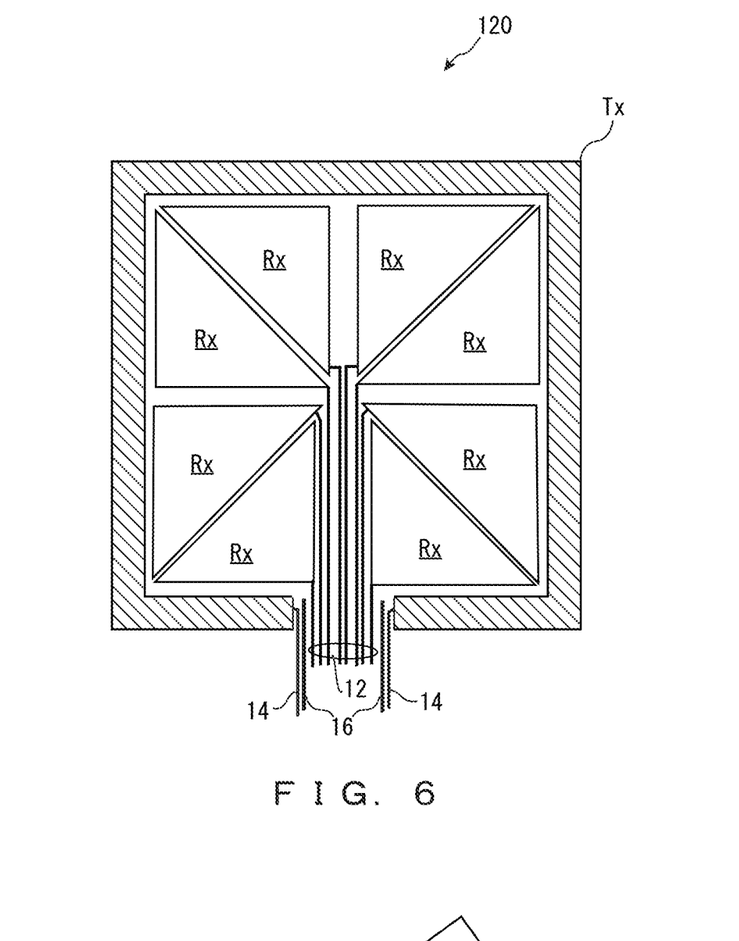
FIG. 6 is a top view illustrating the schematic structure of a touch panel-equipped display device according to modification 3.

Although the foregoing embodiment describes an example in which the touch panel-equipped display device has a circular shape, the touch panel-equipped display device is not limited to a circular shape. An example is a touch panel-equipped display device 120 having a rectangular shape illustrated in FIG. 6. Each reception electrode Rx may have a triangular shape, and a transmission electrode Tx may have a rectangular shape with a break in one part of one side. In this case, too, each reception electrode Rx is connected to a reception electrode wire 12, and the transmission electrode Tx is connected to transmission electrode wires 14. Shield wires 16 are arranged between adjacent reception electrode wires 12 and transmission electrode wires 14.

The invention claimed is:

1. A touch panel-equipped display device equipped with a mutual capacitance touch panel, comprising:
    a substrate;
    a plurality of first electrodes spaced from each other on the substrate;
    a second electrode located around or inside the plurality of first electrodes on the substrate, to form a capacitance with each of the plurality of first electrodes; and
    a translucent cover portion facing the substrate, wherein
    each of the plurality of first electrodes or the second electrode is in contact with the cover portion, and an air layer is interposed between the substrate and the cover portion in a region in which an electrode not in contact with the cover portion from among each of the plurality of first electrodes and the second electrode is located,
    the substrate has an opening through the substrate,
    the air layer is formed in the opening and between the cover portion and a region in which an electrode closer in distance to the opening from among each of the plurality of first electrodes and the second electrode is located, and
    the touch panel-equipped display device further includes:
        a display panel located on an opposite side of the substrate from the cover portion, and having an opening at a position facing the opening of the substrate;
        an hour hand and a minute hand pivotally supported in the opening of the substrate and the opening of the display panel; and
        a movement pivotally supporting the hour hand and the minute hand.

2. The touch panel-equipped display device according to claim 1, further comprising:
    a plurality of first wires connected respectively to the plurality of first electrodes;
    a second wire adjacent to at least part of the plurality of first wires, and connected to the second electrode; and
    a grounded shield wire located between the second wire and a first wire adjacent to the second wire.

3. The touch panel-equipped display device according to claim 1,
    wherein the substrate has a circular shape,
    the plurality of first electrodes are arranged in a circular shape,
    the second electrode is located outside or inside the plurality of first electrodes on the substrate, and
    an electrode closer in distance to a periphery of the substrate from among each of the plurality of first electrodes and the second electrode is in contact with the cover portion.

4. The touch panel-equipped display device according to claim 1,
    wherein the cover portion has a relative permittivity of 6.0 or more and 8.0 or less.

* * * * *